May 17, 1949.  J. POWELS  2,470,223
COMBINATION ANIMAL CARRIER AND DISPLAY PEN
Filed March 10, 1945  2 Sheets-Sheet 1
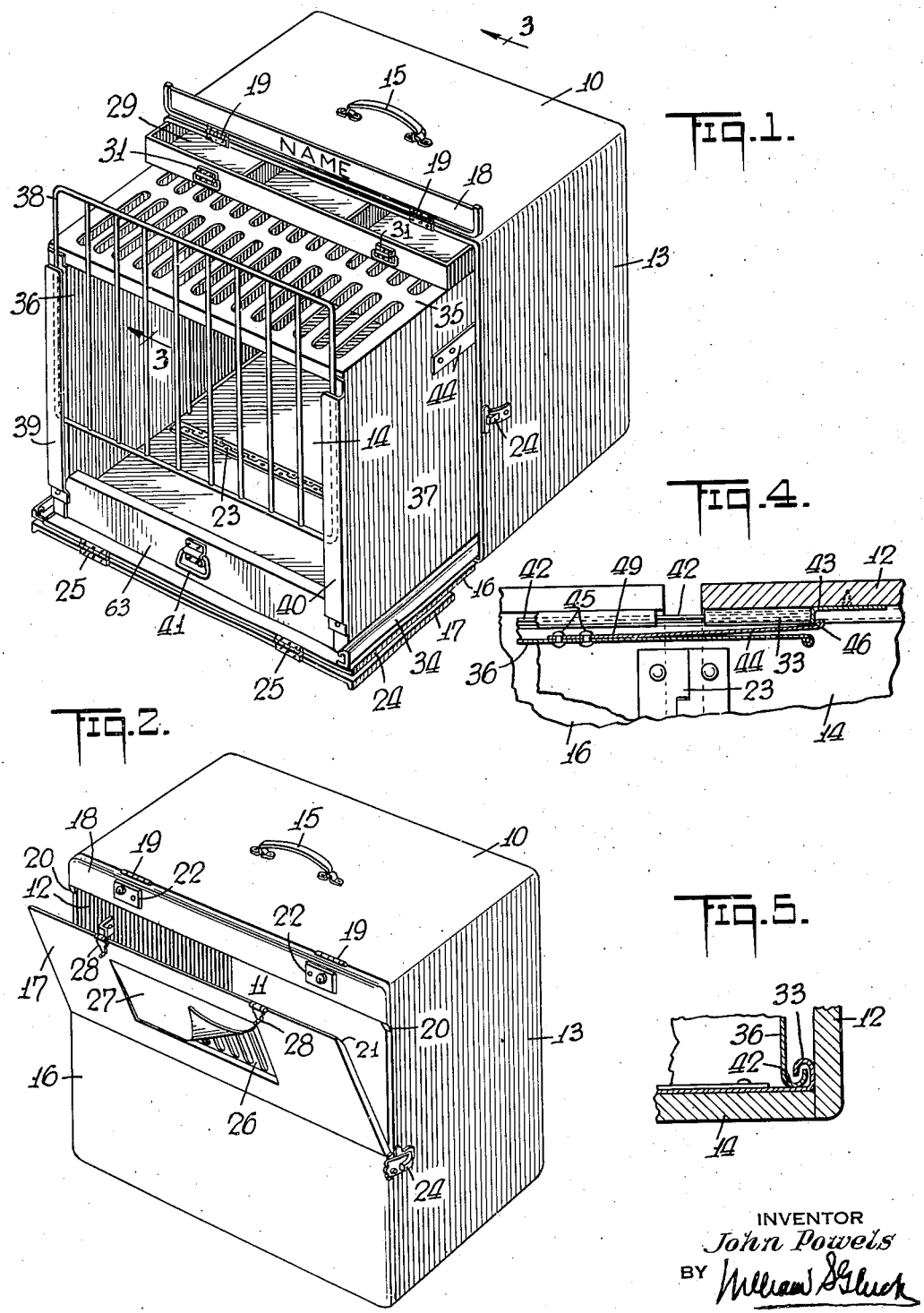
INVENTOR
John Powels
BY William S. Gluck
ATTORNEY May 17, 1949. J. POWELS 2,470,223
COMBINATION ANIMAL CARRIER AND DISPLAY PEN
Filed March 10, 1945 2 Sheets-Sheet 2
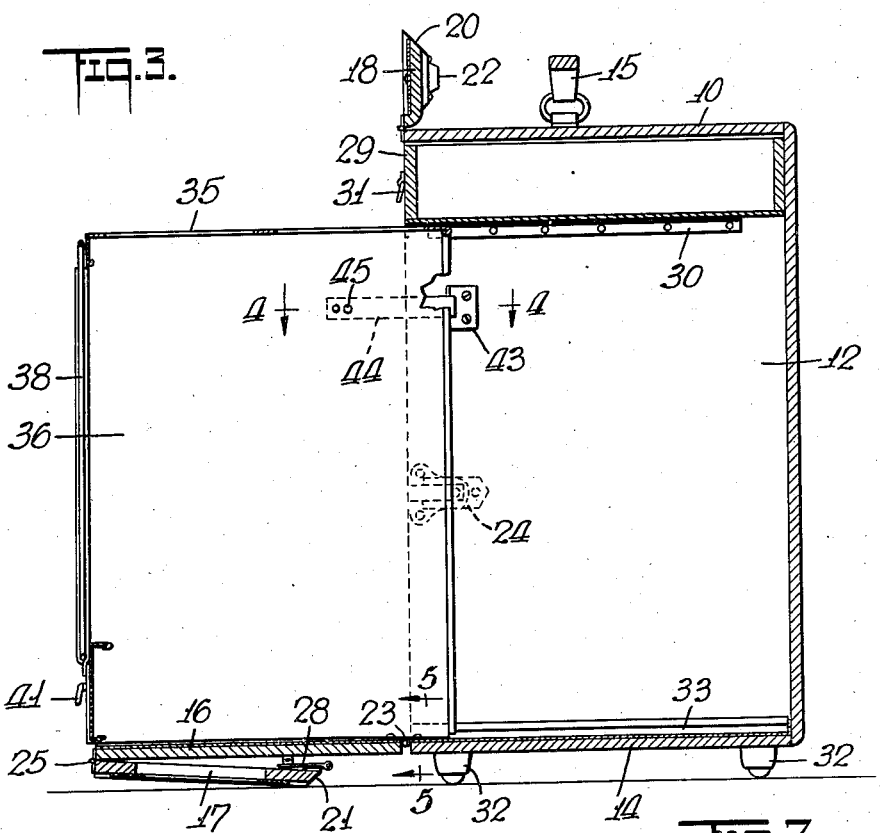
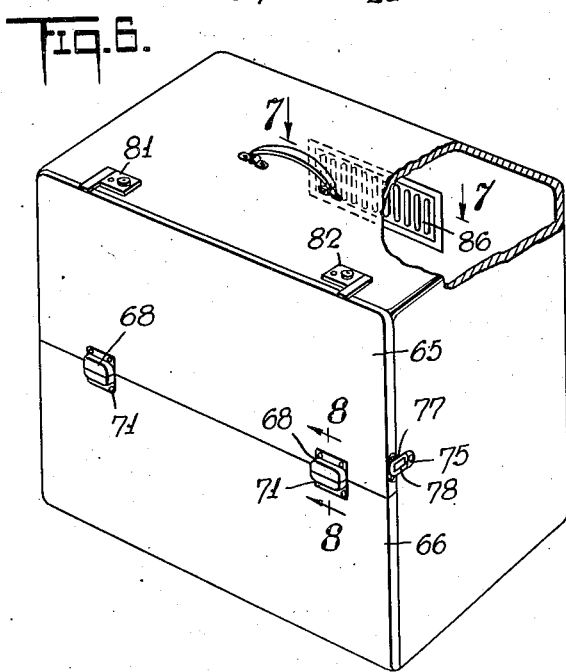
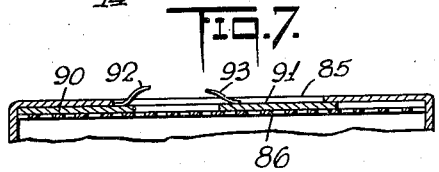
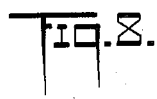
INVENTOR
John Powels
BY William S. Gluet
ATTORNEY Patented May 17, 1949

2,470,223

UNITED STATES PATENT OFFICE 2,470,223

COMBINATION ANIMAL CARRIER AND DISPLAY PEN

John Powels, New York, N. Y.

Application March 10, 1945, Serial No. 582,101

2 Claims. (Cl. 119—19)

My present invention relates generally to dog carrier luggage adapted for conversion from a dog carrier to a dog pen and coordinately relates to an attachment and features which permit of the attainment of such conversion.

From one aspect, my invention relates to an attachment, which when associated with an article of luggage designed for the transportation of pet animals, such as dogs, will serve to convert the article of luggage into an enlarged display pen, and to features in the article of luggage which are particularly adapted for receiving therein the attachment referred to.

From another aspect, my invention relates to an article of luggage, generally referred to as a dog carrier, having therein a section which when fully telescoped within the carrier will permit the carrier to assume its conventionally closed condition and which when the carrier is opened can be moved into an extended position to convert the carrier into an enlarged dog pen.

From still another aspect, my invention relates to an improved type of box or article of luggage designed for the transportation of pet animals, such as dogs.

From a still further aspect, my invention relates to an improved type of display pen for use at dog shows or the like.

My invention includes the provision of an outer box or container which is complete in itself and which may serve, if desired, as an ordinary carrier for the purpose of transporting an animal from place to place. From this aspect, my present invention provides improved arrangements for properly ventilating the carrier, gaining access to the interior thereof, transporting accessories along with the animal, and in other respects simplifying and rendering more efficient the process of transporting an animal under proper conditions.

In accordance with my present invention, I provide, in association with a complete outer box of the foregoing general character, an inner cage-like member which is wholly independent of the outer member or box yet capable of being associated therewith in a manner which fulfills the general objects of my invention.

In the embodiment herein illustrated by way of example, the inner cage-like member is provided with an apertured top and with a front wall having a removable or adjustable grating. Depending from the top are a pair of opposite side walls, but the cage is devoid of any bottom or of a fourth side wall.

In a preferred embodiment, one of the side walls of the outer box is adjustable to open that side of the box, and the inner cage is adapted to fit snugly and telescopically into the outer box by inserting and withdrawing it into and from the box through the open side of the box. The cage is of a size to permit its complete enclosure within the outer box so that it does not interfere in the least with the ordinary use of the outer box as an ordinary carrier.

Briefly, when the device is to be used as a display pen, the openable side of the outer box is opened, and the cage is telescopically withdrawn, the front wall of the cage serving as a substitute side wall of the box, and the capacity of the device as a whole being increased to provide a relatively large enclosure for the animal to be displayed.

A particular feature of my invention lies in providing means whereby the openable side of the outer box serves an important function in permitting the inner cage to be properly adjusted. In the form shown, this side wall of the box is provided with guides or tracks which facilitate the slidable movement of the cage into and out of the box.

Another feature lies in providing latch means for limiting the telescopic withdrawal of the cage at those times at which its total withdrawal is not desired.

Other features of my invention contributing toward the provision of a unitary device of improved characteristics will be more fully set forth in this specification.

For the attainment of the foregoing objects and such other objects as may hereinafter appear or be pointed out, I have illustrated an embodiment of my invention in the accompanying drawings, wherein:

Figure 1 is a perspective view of a device constructed in accordance with my present invention and shown in adjustment for display purposes;

Figure 2 is a similar view showing the outer box by itself in the manner in which it may be employed as an ordinary carrier;

Figure 3 is an enlarged cross-sectional view taken substantially along the line 3—3 of Figure 1;

Figure 4 is an enlarged, fragmentary, cross-sectional view taken substantially along the line 4—4 of Figure 3; and Figure 5 is an enlarged, fragmentary, cross-sectional view taken substantially along the line 5—5 of Figure 3.

Figure 6 is a perspective view of a modified embodiment.

Figure 7 is a section take on line 7—7 of Figure 6; and

Figure 8 is a section taken on line 8—8 of Figure 6.

Figure 2 shows an outer box or container having a top 10, a rear wall 11, a pair of opposite side walls 12 and 13, and a bottom wall 14 (Figure 5). The box may be of any suitable material and is shown as provided with a handle 15 mounted upon the top 10. The front wall is comprised of sections for purposes hereinafter to be made clear. The front wall is shown in Figure 2 as comprised of the lower section 16, the upper or intermediate section 17, and the top section 18. The top section 18 is relatively narrow and is hinged, as at 19, to the top wall 10. The opposite ends of its lower edge are preferably beveled as shown at 20 to cooperate with a similarly beveled edge 21 on the section 17. The section 18 may also be provided with the latch elements 22.

The lower section 16 extends approximately half way up the side of the box and is hinged at its bottom edge, as at 23 (Figure 3), to the bottom wall 14. This section is normally held closed by latches or locking elements such as shown at 24 in Figure 2 and which cooperate with the adjacent sides 12 and 13. The section 16 is adapted to swing downwardly into substantial alignment with the bottom 14, as shown most clearly in Figures 1 and 3.

The section 17 fills the gap between the upper edge of the section 16 and the lower edge of the section 18, and is hinged to the upper edge of the section 16, as at 25, thereby permitting the section 17 to swing outwardly and downwardly in the manner indicated in Figure 2.

The section 17 is advantageously provided with the apertured plate or ventilating grating 26, and the latter is preferably covered over by a flap 27 adapted to be lifted or rolled up when desired. The section 17 is also provided with the locking elements 28 which cooperate with the elements 22.

When it is desired to use this box alone as a complete animal carrier, it may be opened either partially or wholly by manipulating the locking elements 22, 28 and 24, as desired. When the box is closed, all these elements are caused to cooperate, thereby sealing the entire container and forming a complete enclosure for the animal, ventilation being afforded through the plate 26.

Preferably, though not necessarily, I provide a compartment immediately beneath the top wall 10 for the purpose of transporting necessary accessories. Such a storage compartment is shown in the drawings in the form of a drawer 29 supported upon suitable guides 30 and having its front wall provided with the handles 31. The drawer is of such a depth that it is entirely concealed by the top section 18 when the latter is down, as shown in Figure 2, this section overlying the front wall of the drawer 29.

When the outer box is to be associated with the inner cage, which is a wholly independent member and may be entirely dispensed with during transportation, if desired, the section 17 is first swung downwardly to overlie the section 16. The locks 24 are then loosened and the section 16 is swung forwardly so that it will ultimately assume the position shown most clearly in Figure 3. At this position, it is to be noted that the section 17 underlies the section 16 and is, therefore, completely out of the way. In addition, the section 17 serves as a support for the section 16 and maintains the latter in substantial alignment with the bottom 14 of the box. In other words, the height of the legs 32 is substantially equal to the height of the section 16 when the latter rests upon the underlying section 17. Obviously, the legs 32 need not of necessity be provided, but it is preferable in practice.

Upon the bottom 14, and adjacent to the lower edges of the sides 12 and 13, I provide guides, which I have shown in the form of overhanging rails or channels 33. Similar guides or rails 34 are carried on the interior of the section 16 and align themselves with the rails 33 when the box is opened, the section 16 thereby forming, in effect, a forward extension of the bottom 14.

The cage I have illustrated consists of an apertured top wall 35, the two opposite side walls 36 and 37, and a front wall, a part of which is constituted by a grating 38. The grating is vertically slidable within guideways 39 and 40, and is thus capable of total removal or adjustment for the purpose of gaining access to the interior of the enclosure. The front wall of the cage also may comprise a panel member 63, provided with the handle 41, which facilitates its manipulation. The entire cage member is preferably made of metal. On the outside of the walls 36 and 37, and adjacent to their lower edges, I provide guides or rails 42 (Figure 5) which are configured to engage with the rails 33 and 34 previously mentioned. Thus, the rear ends of the rails 42 are first caused to engage with the front ends of the rails 34, and the cage is then slid backwardly into the box, engaging first with the rails 34 and then with both the rails 34 and 33.

Before proceeding to describe other features of my invention, I will point out that the cage is of such a size that, if desired, it may be pushed all the way rearwardly into the confines of the outer box and that, when so pushed, it fits snugly within this box and may be entirely enclosed by the latter. In other words, with the cage pushed rearwardly to its full extent, the front wall of the outer box may be closed and locked in the usual manner. Since the cage has no floor or bottom, and no rear wall, it may be pushed rearwardly or withdrawn partially or entirely without disturbing or interfering with any animal that may be accommodated within the box and upon the bottom 14.

In accordance with one feature of my invention, I provide means for limiting the outward movement of the cage, except at those times when it is desired purposely to withdraw the cage entirely. I have shown projections or lugs 43 mounted on the inside of the walls 12 and 13 respectively, and adjacent to the forward edges of the latter. I also provide resilient fingers 44 upon the exteriors of the cage walls 36 and 37. The finger 44 which is shown most clearly in Figure 4 is riveted, as at 45, to the wall 36 and extends rearwardly, terminating in a bead or enlarged head 46. When the cage is inserted, the fingers 44 must be pressed against the walls 36 and 37 to permit the heads 46 to pass the projections 43. Thereafter, the resilient nature of the fingers 44 urge them outwardly and when the cage is withdrawn forwardly, the heads 46 engage with the projections 43 and prevent withdrawal of the cage further than the approximate position shown in Figure 1. In this position, the rails 42 are still in engagement with the rear rails 33.

When it is desired to withdraw the cage entirely, the fingers 44 are pressed inwardly to release the heads 46.

The embodiment of Figure 6 differs from that of Figure 5 in that the front wall is comprised of a lower section 66 hinged to the bottom as is the section 16 in Figure 3 so that it may be swung into the plane of the bottom of the container, reference being had to Figure 3 for a showing of the details of construction whereby this movement of the lower section 66 can be effected, and of the upper section 65 which is removable and in this respect differs from the showing of the corresponding section 17 in Figure 3 which is hinged at 25 to a lower section 16. Section 65 is maintained in its assembled position of Figure 6 in any preferred or desired manner, one such arrangement being shown in Figure 8 wherein spaced lugs 68 at the bottom of the upper member 65 are provided with fingers 69 which engage within the bent ends 70 of the spaced lug 71 secured to the lower member 66. The assembly of the part 65 is initially effected by inter-engaging these lugs. Section 65 is locked against removal in any preferred or desired manner as by the locking means shown at 75 in Figure 6 wherein a U-shaped pivoted snap lock 77 on the sidewall of the container engages about a lug 78 along the outside edge walls of the member 65. The member 65 is also secured at its top edge by a pivoted locking arrangement 81 such as conventionally used to close briefcases, valises and the like.

Another respect wherein the embodiment of Figure 6 differs from that of Figure 2 is that the ventilation is provided through the rear wall which is cut away as shown in Figure 7 to leave the opening 85 which is covered by the perforated member 86 through which the ventilation is effected. This member 86 is spaced from the rear wall of the container to provide space for the reception of the two slides 90 and 91 provided with the handle members 92 and 93 of any preferred or desired character, and whereby the two slides 90 and 91 can be moved toward and away from each other to adjust the size of the ventilating opening.

It will be understood that the container of Figure 6 is otherwise constructed and arranged as stated of the embodiment of Figure 1 and that it will function in the same way except that whereas in Figure 3 the upper section 17 of the front is swung to underlie the lower section 16, the upper section 65 in Figure 6 is entirely removed. The section 66, however, takes the position of the corresponding member 16 in Figure 3. It will therefore be understood that this embodiment also employs the rails 33 and 34 and is intended to receive an inner container such as shown at 37 in Figure 1 in the same manner and by the same arrangement as shown in Figure 3.

The method of using my device will be clear from the description given. If it is desired to transport an animal to a dog show or the like, he is placed upon the bottom 14 and the cage member is then associated with the box and snugly fitted therein in a telescopic manner. The box is then closed in the usual manner and the animal transported. Upon arriving at the place of exhibition, it is not necessary to arrange for a special display pen or to remove or handle the animal. The box is simply opened into the condition shown in Figure 3; the handle 41 is pulled to withdraw the cage to its maximum position (or to any intermediate position); and the animal is then ready for display within a relatively large display pen. To gain access to the animal, it is merely necessary to raise the grating 38 by a desired amount.

One of the features of my present device lies in the section 18 which may be swung upwardly into the position shown in Figures 1 and 3, this section being then retained by gravity in the vertical position shown. This uncovers and discloses not only the drawer 29 but also the under-surface of the section 18, upon which under-surface the name of the animal or other significant information may be suitably inscribed. In again transporting the animal from the exhibition, it is necessary merely to push the cage inwardly (which does not disturb the animal in the least except to reduce his area of movement); close the drawer 29; and close the outer box in the manner above described.

It will thus be seen that I have provided an assembly which is exceedingly simple in structural nature, compact, staunch, yet highly efficient and useful in fulfilling its contemplated functions.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is:

1. A combination animal carrier and display pen including a rectangular outer box complete in itself and having a bottom, a top, side walls and end walls, one of said end walls being hinged at its bottom to swing downwardly into alignment with said bottom to form a forward extension thereof, and a cage-like member dimensioned to telescope into and out of said box when said side wall is swung downwardly to open position, said cage-like member having a top, a bottom, side walls and a front wall, the cage being open at its rear whereby when the hinged side wall of the box is swung downwardly and the cage-like member withdrawn to its extended relation the compartment of the carrier will be enlarged; and means for guiding said cage-like member in its outward movement and for holding and supporting it in its extended relation, said means comprising rails on the inner face of the bottom of the cage parallel to and adjacent the side edges thereof and rails on the inner face of said hinged wall also parallel and adjacent its side edges, said last-mentioned guide rails being so located that when the hinged wall is moved downwardly to form an extension of the bottom, they will be in alignment with the guide rails adjacent the side edges of the bottom wall.

2. A combination animal carrier and display pen including a rectangular outer box complete in itself and having a bottom, a top, side walls and end walls, one of said end walls hinged at its bottom to swing downwardly into alignment with said bottom and form a forward extension thereof and means for guiding said cage-like member in its outward movement and for holding and supporting it in its extended relation, and guide rails on the inner face of the bottom of the cage parallel to and adjacent the side edges thereof and guide rails on the inner face of said hinged wall also parallel and adjacent its side edges, said last-mentioned guide rails being so located than when the hinged wall is moved downwardly to form an extension of the bottom, they will be in alignment with the guide rails adjacent the side edges of the bottom wall whereby the cage-like member can be guided by said rails when said side wall is swung downwardly to open position to enlarge the size of the carrier.

JOHN POWELS.

REFERENCES CITED

The following references are of record in the file of this patent:

UNITED STATES PATENTS

| Number | Name | Date |
|---|---|---|
| 231,643 | Baldwin | Aug. 31, 1880 |
| 1,122,964 | Maloney | Dec. 29, 1914 |
| 1,129,759 | Thunemann | Feb. 23, 1915 |
| 1,303,736 | Speicher | May 13, 1919 |
| 1,429,052 | Ward | Sept. 12, 1922 |
| 1,449,428 | McGaffee | May 27, 1923 |